United States Patent
Ng et al.

(10) Patent No.: US 10,762,263 B1
(45) Date of Patent: Sep. 1, 2020

(54) SEARCHING FOR VALUES OF A BUS IN DIGITAL WAVEFORM DATA

(71) Applicant: Xilinx, Inc., San Jose, CA (US)

(72) Inventors: Roger Ng, Campbell, CA (US); David K. Liddell, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 219 days.

(21) Appl. No.: 15/988,293

(22) Filed: May 24, 2018

(51) Int. Cl.
*G06F 30/3312* (2020.01)
*G06F 30/367* (2020.01)
*G06F 119/12* (2020.01)

(52) U.S. Cl.
CPC ........ *G06F 30/3312* (2020.01); *G06F 30/367* (2020.01); *G06F 2119/12* (2020.01)

(58) Field of Classification Search
CPC ..................... G06F 16/90344; G06F 16/90348
See application file for complete search history.

*Primary Examiner* — Jack Chiang
*Assistant Examiner* — Aric Lin
(74) *Attorney, Agent, or Firm* — Crawford Maunu PLLC

(57) ABSTRACT

A method includes inputting to a computer processor a search value. Bit values of bit element signals of a bus at a current time are determined time-ordered value pairs of timestamps and associated bit values of the bit element signals. Whether the bit values at the current time match values of corresponding bits of the search value is determined from the time-ordered value pairs. Data indicative of the current time and bit values of the bit element signals is output if the bit values at the current time match the search value. If any of the bit values at the current time do not match the search value, the current time is advanced to a later time indicated by a time-ordered value pair not matched to the search value and having a latest timestamp of the bit element signals that do not match corresponding bits of the search value.

18 Claims, 5 Drawing Sheets

US 10,762,263 B1

SEARCHING FOR VALUES OF A BUS IN DIGITAL WAVEFORM DATA

TECHNICAL FIELD

The disclosure generally relates to searching for a value of one or more buses in digital waveform data.

BACKGROUND

During testing and debugging of a circuit design, a circuit designer may want to identify the time during a simulation of the circuit design at which the value of bit element signals carried on one or more buses matches a search value. Viewing waveforms of the bit element signals of the bus around the time of occurrence of the search value may provide useful information in debugging the circuit design. However, locating the search value in the digital waveform data can require significant computing time. As bus values from the simulation are arranged in chronological order, sequentially searching all the values of the bus for the search value can result in extended search times.

SUMMARY

A method includes inputting to a computer processor a search value. The computer processor determines bit values of a plurality of bit element signals of a bus at a current time from a data set that includes a plurality of time-ordered value pairs of timestamps and associated bit values of the plurality of bit element signals of the bus. The computer processor determines from the time-ordered value pairs whether the bit values of the plurality of bit element signals at the current time match values of corresponding bits of the search value. The computer processor outputs data indicative of the current time and bit values of the plurality of bit element signals in response to the bit values of all of the plurality of bit element signals at the current time matching values of the corresponding bits of the search value. In response to any of the bit values of the plurality of bit element signals at the current time not matching values of the corresponding bits of the search value, the computer processor advances the current time to a later time indicated by a latest timestamp of an unmatched bit value. The computer processor repeats the determining and the advancing until the bit values of all of the plurality of bit element signals at the current time match values of the corresponding bits of the search value or reaching an end of the data set.

A method includes inputting to a computer processor a search value. The computer processor determines from a data set, bit values of a first plurality of bit element signals of a first bus at a current time and bit values of a second plurality of bit element signals of a second bus at the current time, wherein the data set includes a first plurality of time-ordered value pairs of timestamps and associated bit values of the first plurality of bit element signals and a second plurality of time-ordered value pairs of timestamps and associated bit values of the second plurality of bit element signals. The computer processor determines from the first time-ordered value pairs whether the bit values of the first plurality of bit element signals at the current time match values of corresponding bits of the search value. The computer processor determines from the second time-ordered value pairs whether the bit values of the second plurality of bit element signals at the current time match values of corresponding bits of the search value. The computer processor outputs data indicative of the current time and bit values of the first plurality of bit element signals in response to the bit values of all of the first plurality of bit element signals at the current time matching values of the corresponding bits of the search value. The computer processor outputs data indicative of the current time and bit values of the second plurality of bit element signals in response to the bit values of all of the second plurality of bit element signals at the current time matching values of the corresponding bits of the search value. The computer processor determines a first time indicated by a latest timestamp of an unmatched bit value of a bit of the first plurality of bit element signals. The computer processor determines a second time indicated by a latest timestamp of an unmatched bit value of a bit of the second plurality of bit element signals. In response to any of the bit values of the first plurality of bit element signals and the second plurality of bit element signals at the current time not matching values of the corresponding bits of the search value, the computer processor advances the current time to an earlier of the first time and the second time. The computer processor repeats the determining and the advancing until the bit values of all of the first plurality of bit element signals and the second plurality of bit element signals at the current time match values of the corresponding bits of the search value or reaching an end of the data set.

A system includes a computer system including a processor and a memory configured with instructions that when executed by the processor cause the processor to perform operations. The operations include inputting to the processor a search value. The operations include determining bit values of a plurality of bit element signals of a bus at a current time from a data set that includes a plurality of time-ordered value pairs of timestamps and associated bit values of the plurality of bit element signals of the bus. The operations include determining from the time-ordered value pairs whether the bit values of the plurality of bit element signals at the current time match values of corresponding bits of a search value input to the processor. The operations include outputting data indicative of the current time and bit values of the plurality of bit element signals in response to the bit values of all of the plurality of bit element signals at the current time matching values of the corresponding bits of the search value. The operations include advancing, in response to any of the bit values of the plurality of bit element signals at the current time not matching values of the corresponding bits of the search value, the current time to a time indicated by a timestamp of a time-ordered value pair of a bit value of a bit of the plurality of bit element signals not matched to a corresponding bit of the search value and having a latest timestamp of timestamps of all bits of the plurality of bit element signals that do not match corresponding bits of the search value. The operations include repeating the determining and the advancing until the bit values of all of the plurality of bit element signals at the current time match values of the corresponding bits of the search value or reaching an end of the data set.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

Figure 1:
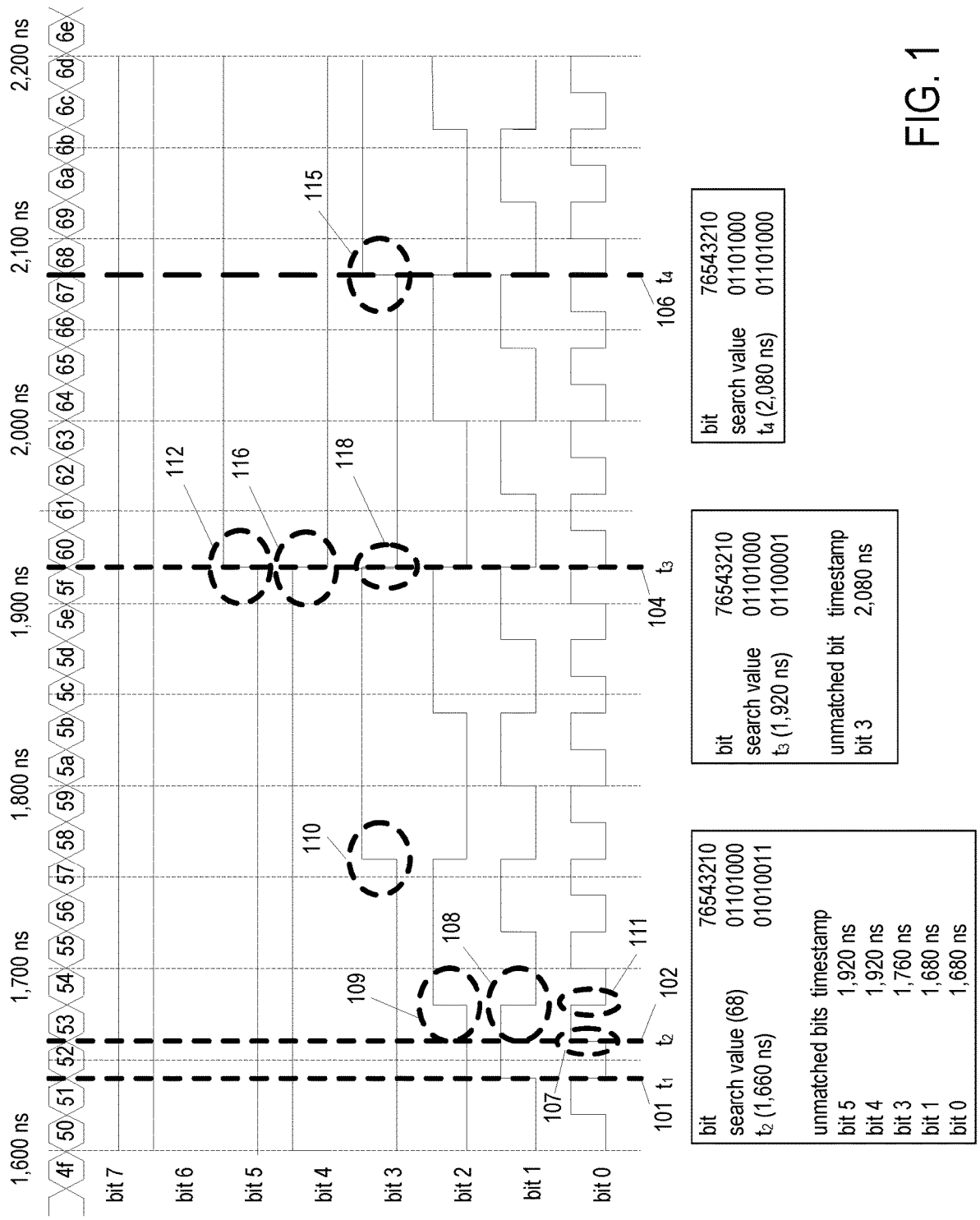
FIG. 1 shows waveforms and corresponding values of a bus during a simulation of a circuit design.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

During simulation of a circuit design including one or more buses, a data set is generated including time-ordered pairs of timestamps and associated values of bit element signals of the buses. Each time-ordered value pair includes a timestamp in the simulation when the bit value of a bit element signal of a digital bus transitioned from low (e.g., logic "0") to high (e.g., logic "1") or from high to low. The time-order value pairs also include the bit value to which the bit element signal transitioned. In searching for a desired value in the data set, previous approaches sequentially search the time-ordered value pairs for a collection of bit element signals of a bus that match the search value. As used herein, "search value" refers to a desired value of the bus. Previous approaches include retrieving the values of all of the bit element signals of the bus at each time interval, concatenating the values into a binary value of the bus, and comparing the bus value to the search value at every interval. The runtime of the sequential search algorithm increases as the quantity of time-ordered value pairs increases.

The disclosed methods and systems provide approaches that use the time-ordered value pairs for one or more bits of the bus to identify the timestamp(s), if any, at which the value of the bus matches a search value. The disclosed methods and systems advantageously avoid comparing each value of the bus, one by one, to the search value by skipping ahead in the data set to the latest of the timestamps of the bits of the bus that do not match the corresponding bits of the search value. The number of comparisons performed by a processor circuit, such as a computer processor (or "processor" for brevity), during a search can be significantly reduced, thereby decreasing the runtime of the search. The processing time and the resources used by the computer to perform the search thereby improve the performance of the processor and a system including the processor.

FIG. 1 shows waveforms and corresponding values of an exemplary bus during a simulation of a circuit design. The bus is eight bits wide and each of the eight waveforms corresponds to a respective bit of the bus, bit 0 to bit 7. FIG. 1 shows the waveforms of the bus from 1,600 nanoseconds (ns) to 2,200 ns of the simulation. The values of the bus are shown above the waveforms. For example, at 1,600 ns, the value of the bus is hexadecimal 50 and at 2,200 ns, the value of the bus is hexadecimal 6e.

In illustrating the disclosed approaches by way of the exemplary bus waveforms shown in FIG. 1, the search is underway and is presently evaluating values of the bit element signals of the bus at a current time of 1,660 ns. The search process determines at the current time ($t_2$, 1,660 ns) whether the value of the bus (hexadecimal 53) matches a search value (hexadecimal 68). If any of the bit values of the bit element signals of the bus at the current time do not match corresponding bit elements of the search value, the disclosed approaches use the transitions of the bit element signals of the bus, such as the transitions of the waveforms illustrated in FIG. 1, to determine the latest next transition (e.g., those in circles 112 and 116) of the bit element signals corresponding to the bits that do not match the search value. The soonest that the search value can match the bit value of the bus is after the bit values of all the unmatched bits have transitioned at least once. Thus, the search process need not compare the values of the bus between the current time (e.g., 1,660 ns) and the time of the latest next transition of the unmatched bits. In the example of FIG. 1, bits 4 and 5 transition at $t_3$ (1,920 ns) in FIG. 1) and do not match the corresponding bits of the search value, and 1,920 ns is the latest next transition of the unmatched bits 0, 1, 3, 4, and 5. The process is repeated until the value of the bus matches the search value, which in the example is at $t_4$, 2,080 ns, or the end of the simulation data is reached. Further aspects and information shown in FIG. 1 is explained further below in conjunction with the processes and data structures illustrated in FIGS. 2, 3, and 4.

Figure 2:
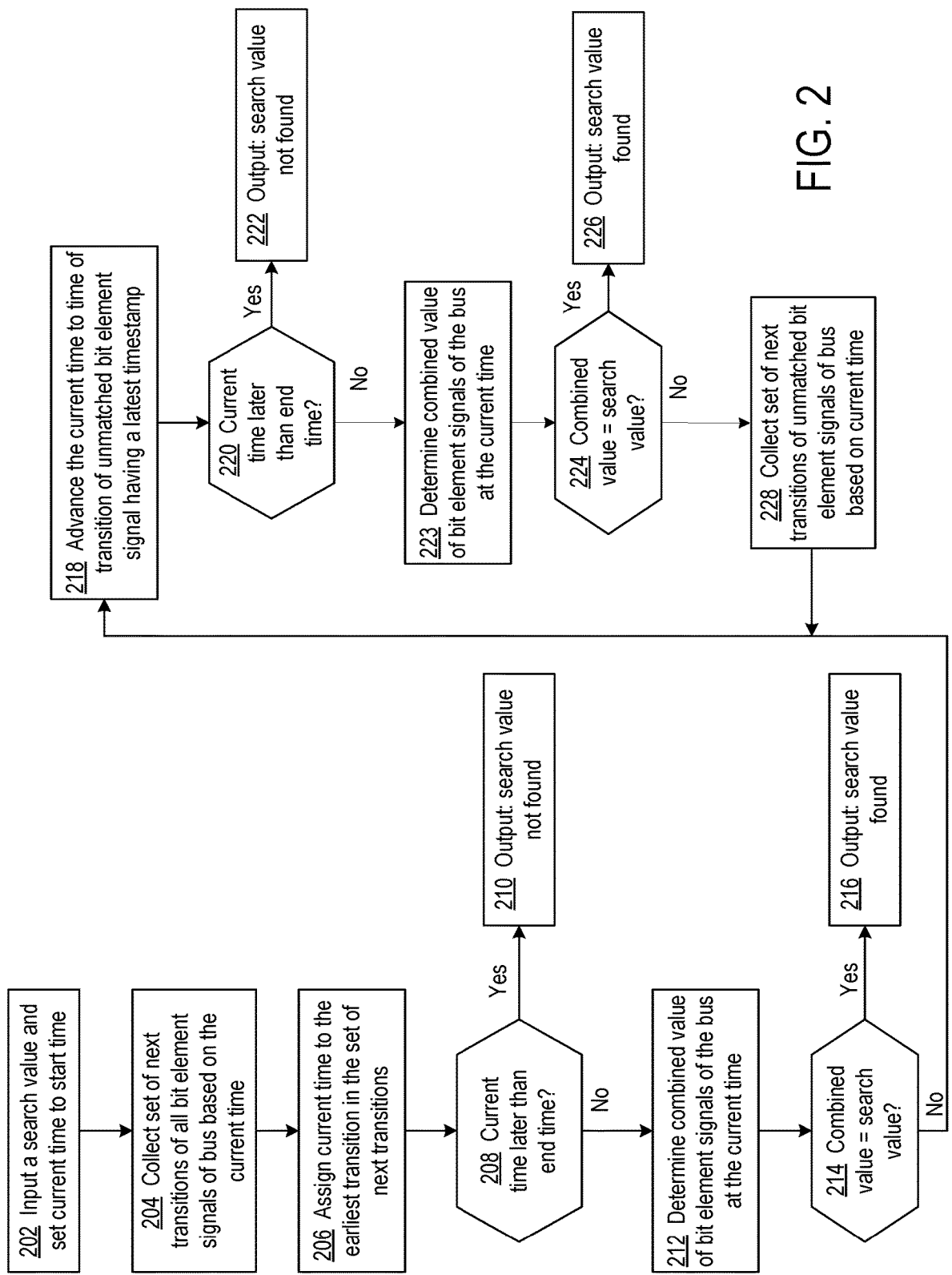
FIG. 2 illustrates a flowchart of an exemplary process for searching for a bus value in a data set of time-ordered value pairs of digital waveforms of the bus.

FIG. 2 illustrates a flowchart of an exemplary process for searching a data set of time-ordered value pairs of digital waveforms of a bus for a search value. At block 202, a search value is input to a processor circuit, such as a computer processor (or "processor" for brevity). A current time is set to the start time. As used herein, "start time" refers to the start time of a dataset of a simulation of a bus of a circuit design and "end time" refers to the end time of the simulation. For example, if a simulation runs for 2,500 ns, then the start time is 0 ns and the end time is 2,500 ns. As used herein, "current time" refers to a time relative to the simulation at which the value of the bus is analyzed.

Figure 3:
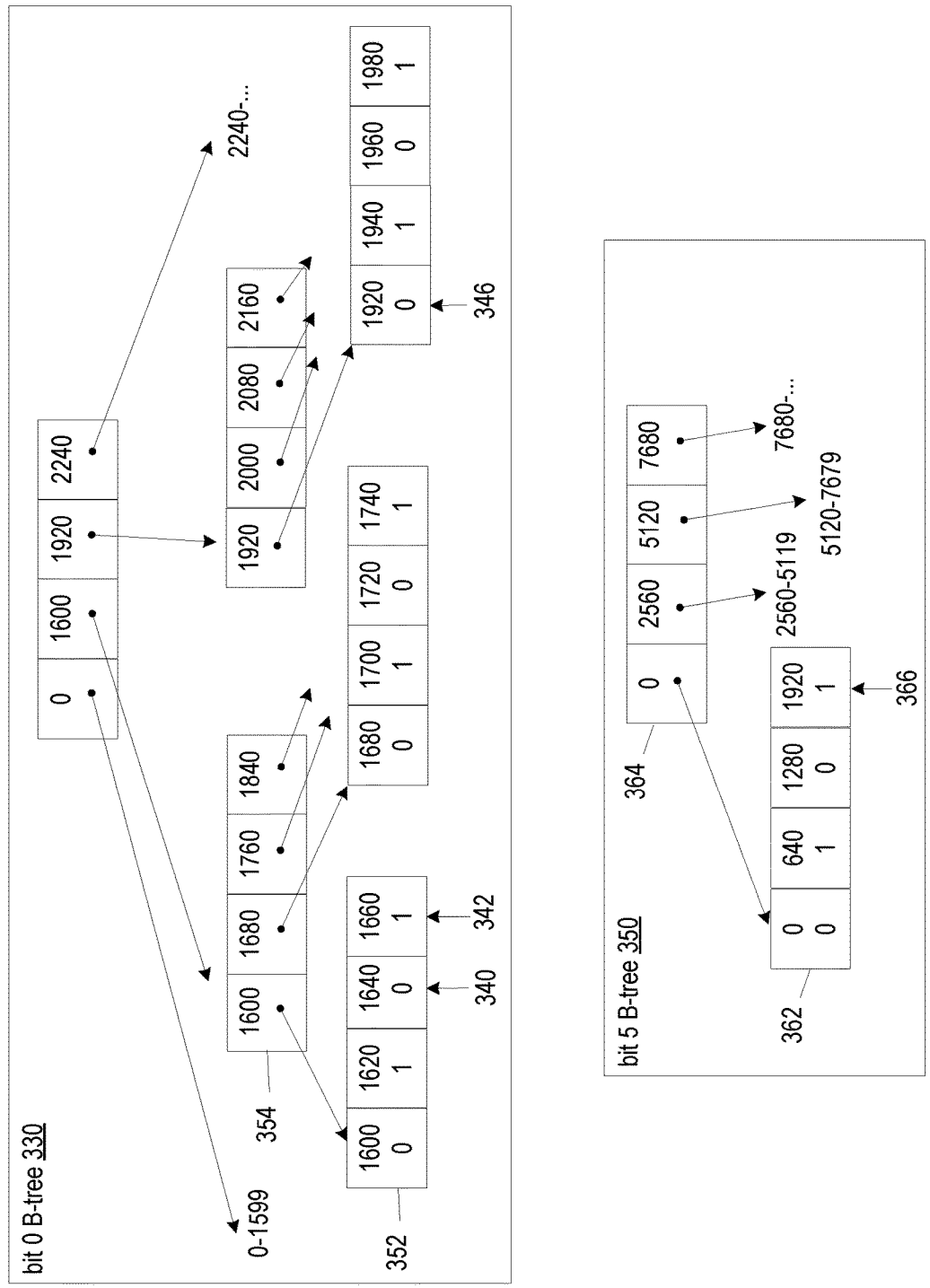
FIG. 3 shows portions of B-trees of the bit element signals corresponding to bits 0 and 5 of the bus of FIG. 1.

At block 204, the processor collects a set of next transitions of all the bit element signals of the bus based on the current time. Bit values of the bit elements signals of the bus at the current time are determined by the processor from a data set that includes time-ordered value pairs of the bit values of the bit element signals of the bus and associated timestamps. Determining the set of next transitions and the bit values at the current time can include traversing B-trees, which are indexed by ranges of simulation times, for the bit element signals of the bus. If a bit element signal of the bus transitions at the current time, then the corresponding B-tree will include a time-ordered value pair at the lowest level of the B-tree, and the time-ordered value pair will have an associated timestamp equal to the current time. The time-ordered value pair indicates the timestamp of a transition of the bit element signal and the bit value to which the signal transitioned. If a bit element signal of the bus does not transition at the current time, then the corresponding B-tree will not include a time-ordered value pair having a timestamp equal to the current time at the lowest level of the B-tree. If there is no time-ordered value pair for a bit element signal at the current time, then the bit value of the bit element signal is the bit value of the previous transition. Exemplary B-trees 330 and 350 associated with the bit element signals corresponding to bits 0 and 5 of the bus of FIG. 1 are shown in FIG. 3. Exemplary traversal of the B-trees 330 and 350 are explained further below.

At block 206, the processor assigns the current time to the earliest transition in the set of next transitions collected at block 204. Referring back to FIG. 1, the current time is $t_1$ (1,640 ns) indicated by the dashed line 101, and the search value is hexadecimal 68. The set of next transitions collected at block 204 includes the transitions encircled by the dashed circles 107, 108, 109, 110, 112, and 116. Note that the next transitions of the bit element signals corresponding to bits 6 and 7 of the bus are not shown in FIG. 1 because the next transitions of bits 6 and 7, if they occur, occur after 2,200 ns. The earliest of the next transitions is encircled by the dashed circle 107 where the bit element signal corresponding to bit 0 transitions from low to high at 1,660 ns. Thus, at block 206, the current time is advanced to $t_2$ (1,640 ns) indicated by the dashed line 102.

Referring again to FIG. 2, at decision block 208, the processor determines whether the current time is later than the end time of the data set. If the current time is later than the end time, then at block 210, the processor outputs data indicating that the search value was not found. If the current time is not later than the end time, then at block 212, the processor determines a combined value of the bit element signals of the bus at the current time. Turning back to FIG. 1, the current time (1,660 ns) is not later than the end time (2,200 ns or later). At block 212, the combined value of the bit element signals of the bus at 1,660 ns is determined. Determining the combined value can include combining the values of the bit element signals of the bus at the current time. In the example of FIG. 1, the search value is hexadecimal 68, which has an equivalent bit value of 01101000. The value of the bit element signals of the bus at 1,660 ns is hexadecimal 53, which has an equivalent bit value of 01010011.

Referring again to FIG. 2, at decision block 214, the processor determines whether the combined value of the bus is equal to the search value. The combined value of the bus is determined based on the set of next transitions collected at block 204. If the combined value of the bus at the current time matches the search value, then at block 216, the processor outputs data indicative of the current time and the bit values of the bit element signals of the bus at the current time. In an exemplary implementation, the output data can be to a display device for rendering a waveform view such as that shown in FIG. 1, with the cursor at the time at which the bus value is equal to the search value. If the combined value of the bus at the current time does not match the search value (e.g., any of the bit values of the bit element signals of the bus at the current time do not match the corresponding bit values of the search value), then at block 218, the processor advances the current time to a time indicated by a latest timestamp of timestamps of the time-ordered value pairs of timestamps and bit values of the bit element signals of the bus that do not match corresponding bits of the search value.

Turning back to FIG. 1, at block 214, the combined value of the bus is compared to the search value. The time-ordered value pairs for the next transitions of bits 5, 4, 3, 1, and 0 (encircled by circles 112, 116, 110, 108, and 111 respectively) are (1,920 ns, 1), (1,920 ns, 0), (1,760 ns, 1), (1,680 ns, 0), and (1,680 ns, 0), respectively. Although a timestamp is described as the first value of the time-ordered value pairs, implementations of the disclosed approaches are not so limited. The time-ordered value pairs are those collected at block 204. The bit values of the bit element signals of the bus at 1,660 ns (01010011) do not match the corresponding bit values of the search value (01101000). Specifically, the bit values of bits 5, 4, 3, 1, and 0 of the bus at the current time do not match the corresponding bits 5, 4, 3, 1, and 0 of the search value. Thus, the process continues to block 218 where the processor determines which of the timestamps of the unmatched bits is the latest. Here, the next transition of bits 5 and 4 have the latest timestamp (1,920 ns). Accordingly, the current time is advanced to $t_3$ (1,920 ns) indicated by the dashed line 104. In at least one implementation, pointers in each of the B-trees corresponding to the bit element signals of the bus are advanced to the current time (from 1,660 ns to 1,920 ns).

Referring again to FIG. 2, at decision block 220, the processor determines whether the current time is later than the end time of the simulation. If the current time is later than the end time, then at block 222, the processor outputs data indicative that the search value was not found. If the current time is not later than the end time, then the process proceeds to block 223. At block 223, the processor determines a combined value of the bit element signals of the bus at the current time. At decision block 224, the processor determines whether the value of the bus determined at block 223 is equal to the search value. If the value of the bus at the current time matches the search value, then at block 226, the processor outputs data indicative of the current time and the bit values of the bit element signals of the bus at the current time. If the combined value of the bus at the current time does not match the search value, then the process continues to block 228 where the processor collects a set of next transitions of unmatched bit element signals of a bus based on the current time and then continues at block 218 as described. The process continues as described above until the bit values of all of the bit element signals of the bus at the current time match values of the corresponding bits of the search value or reaching the end of the data set.

Turning back to FIG. 1, the current time (1,920 ns) is not later than the end time so the process proceeds to block 223. Based on the bit values of the bit element signals at 1,920 ns, the value of the bus at 1,920 ns is 61. At block 224, the processor determines that the bit values of the bit element signals of the bus at 1,920 ns (01100000) do not match the bit value of the search value (01101000). Thus, the process continues at block 228, where the processor collects a set of next transitions of all the bit element signals of the bus based on the current time (1,920 ns).

The set of next transitions collected at block 228 includes the transitions encircled by the dashed circles 115. The latest of those transitions is of bit 3 at 2080 ns. Thus, at block 218 the current time is advanced to 2080 ns, which is the time of transition of the unmatched bit having the latest timestamp.

The current time is advanced to $t_4$ (2,080 ns) indicated by the dashed line 106. In at least one implementation, pointers in each of the B-trees corresponding to the bit element signals of the bus are advanced to the current time (from 1,940 ns to 2,080 ns).

The current time (2,080 ns) is not later than the end time so the process proceeds to decision block 224. The value of the bus at 2,080 ns is hexadecimal 68. The value of the bus matches the search value so data indicative of the current time (2,080 ns) and the bit values of the bit element signals of the bus (01101000) at the current time is output at block 226. Waveforms representing bit values of the plurality of bit element signals of the bus can be displayed. A graphical indicator can be displayed overlaid on the displayed waveforms at the current time.

In at least one implementation, the search value can optionally be associated with a subset of the bit element signals of the bus. The search value can be associated with the beginning bits of the bus including the most significant bit of the bus. For example, the search value can be matched to bits 7, 6, 5, and 4 of the bus of the example of FIG. 1 (hexadecimal 6 (bit value 0110)). Another option is for the search value to be matched to the ending bits of the bus including the least significant bit of the bus. For example, the search value can be associated with bits 3, 2, 1, and 0 of the bus of the example of FIG. 1 (hexadecimal 8 (bit value 1000)). When comparing the value of the bus to the search value at blocks 214 and 224, only the bit values associated with the subset of the bit element signals are compared. If the bit values of the subset of the bit element signals at the current time matches the corresponding bits of the search value, then data indicative of the current time and bit values of all the bit element signals are output at block 216 or block 226. If the bit values of the subset of the bit element signals at the current time does not match the corresponding bits of the search value, then at block 218, the current time is advanced to the time indicated by a timestamp of a time-ordered value pair of a bit value of the bit element signals not matched to a corresponding bit of the search value and having the latest timestamp of the timestamps of all bits of the subset of the bit element signals that do not match corresponding bits of the search value.

FIG. 3 shows portions of B-trees of the bit element signals corresponding to bits 0 and 5 of the bus of FIG. 1. Though B-trees are illustrated for bits 0 and 5, it will be recognized that each bit element signal of the bus has a corresponding B-tree that is indexed by time ranges. The lowest level of each of the B-trees has a data array of time-ordered value pairs indicating pairs of timestamps and values of transitions of the corresponding bit element signal. The time-ordered value pairs can be stored as entries in arrays in which the timestamps fall within a range of time indices of the B-tree. Each array can have the same number of time-ordered value pairs, except that the last array in the B-tree can be partially filled. The time range for the data structure spans from the time of the first time-ordered value pair in the data structure, inclusive of that time, to the time of the first time-ordered value pair in the time-wise next data structure, exclusive of that time. For the final data structure of the B-tree, the end time is considered to be the end time of the simulation.

The index of the B-tree can be a recursive data structure that includes a time-ordered list of value pairs of a timestamp and a data pointer. The data pointer may point to a lowest-level data structure (e.g., containing value pairs of timestamp and bit value) or another index data structure. The timestamp is that of the first value pair of the data structure to which the data pointer points. To search for (or position a B-tree pointer at) time T (not shown in FIG. 3) in the B-tree, the index can be searched, for example, using a standard binary search, linear search, or another search algorithm, to find the value pair for which time T is greater than or equal to the timestamp of the value pair and time T is less than the timestamp of the next value pair. The data pointer of the value pair is then followed. If the data structure found by following the data pointer is another index data structure, then the search and following of the found data pointer is repeated until the search reaches the lowest level of the B-tree and a value pair, including a timestamp and bit value, is reached. To advance a pointer to the next transition in the B-tree, the pointer is advanced one value pair in the current data structure if there is such a value pair. If there is no next pair (because the end of the list of pairs has been reached), then the following process is repeated until the pointer is successfully moved forward in the current data structure. The pointer is moved upward, backwards along the data pointer pointing to the data structure, to the timestamp and data pointer value pair of the data pointer traversed, then the pointer is advanced one value pair. After the pointer is advanced, if the pointer is not in a data structure of the lowest level of the B-tree, then the pointer repeatedly follows the data pointer of the first value pair in the current data structure. Moving the pointer upward may be accomplished, for example, by implementing the data pointer as a bi-directional pointer or by implementing the traversing pointer as a stack of pointers, in which each pointer of the stack points to a pair at one level of the B-tree.

B-tree 330 is associated with the bit element signal corresponding to bit 0, and B-tree 350 is associated with the bit element signal corresponding to bit 5. The B-trees for other bits of the bus are not illustrated to avoid duplicative description. Referring back to the example of FIG. 1, the current time is initially 1,640 ns. Thus, the next transition of the bit element signal is referenced by a pointer in the B-tree 330 pointing to value pair 340 having the timestamp 1,640 ns. At block 204 of FIG. 2, the set of next transitions of the bit element signals of the bus is collected. Beginning at the current time (1,640 ns), the B-tree 330 is traversed to collect the next transition of the bit element signal corresponding to bit 0. The lowest-level data array 352 indicates transitions for timestamps 1,600, 1,620, 1,640, and 1,660 ns. Accordingly, the B-tree 330 is traversed via the index data array 354 to the lowest-level data array 352, which is indexed by the timestamp 1,600 ns. The next transition of bit 0 occurs at 1,660 ns where the bit value transitions to 1 as indicated by value pair 342.

Similarly, the B-tree 350 is traversed, at block 204, beginning at the current time (1,640 ns) to collect the next transition of the bit element signal corresponding to bit 5. The lowest-level data array 362 has transitions at timestamps 640, 1,280, and 1,920 ns. The B-tree 350 is traversed through index array 364 until the lowest level data array 362 is reached. The next transition of bit 5 occurs at 1,920 ns where the bit value transitions to 1 as indicated by value pair 366.

The B-trees of the bit element signals corresponding to the remaining bits (bits 1, 2, 3, 4, 6, and 7) of the bus are traversed in a similar manner to that described above with respect to bits 0 and 5. Of the set of next transitions collected at block 204, the transition of bit 0 at 1,660 ns is the earliest. Accordingly, at block 206, the pointers in each of the B-trees corresponding to the current time are advanced to value pairs at or immediately following 1,660 ns as shown by pointers 342 in B-tree 330 and pointer 366 in B-tree 350.

At block 218, the latest timestamp of the unmatched bits is determined. As described above, the transition of bit 5 at 1,920 ns is the latest timestamp. Accordingly, the pointers in each of the B-trees are advanced to value pairs at or immediately following 1,920 ns as shown by value pairs 346 and 366 in the B-trees 330 and 350, respectively, in FIG. 3. With respect to the B-tree 330, intervening value pairs indexed between time 1,681 ns and 1,919 ns are skipped by traversing the B-tree index and advancing the pointer to value pairs at or immediately following 1,920 ns, thereby expediting the search for the search value. Although not shown in FIG. 3, the B-trees are similarly traversed when the process returns to blocks 204 and 218 as described above with respect to FIGS. 1 and 2.

Figure 4:
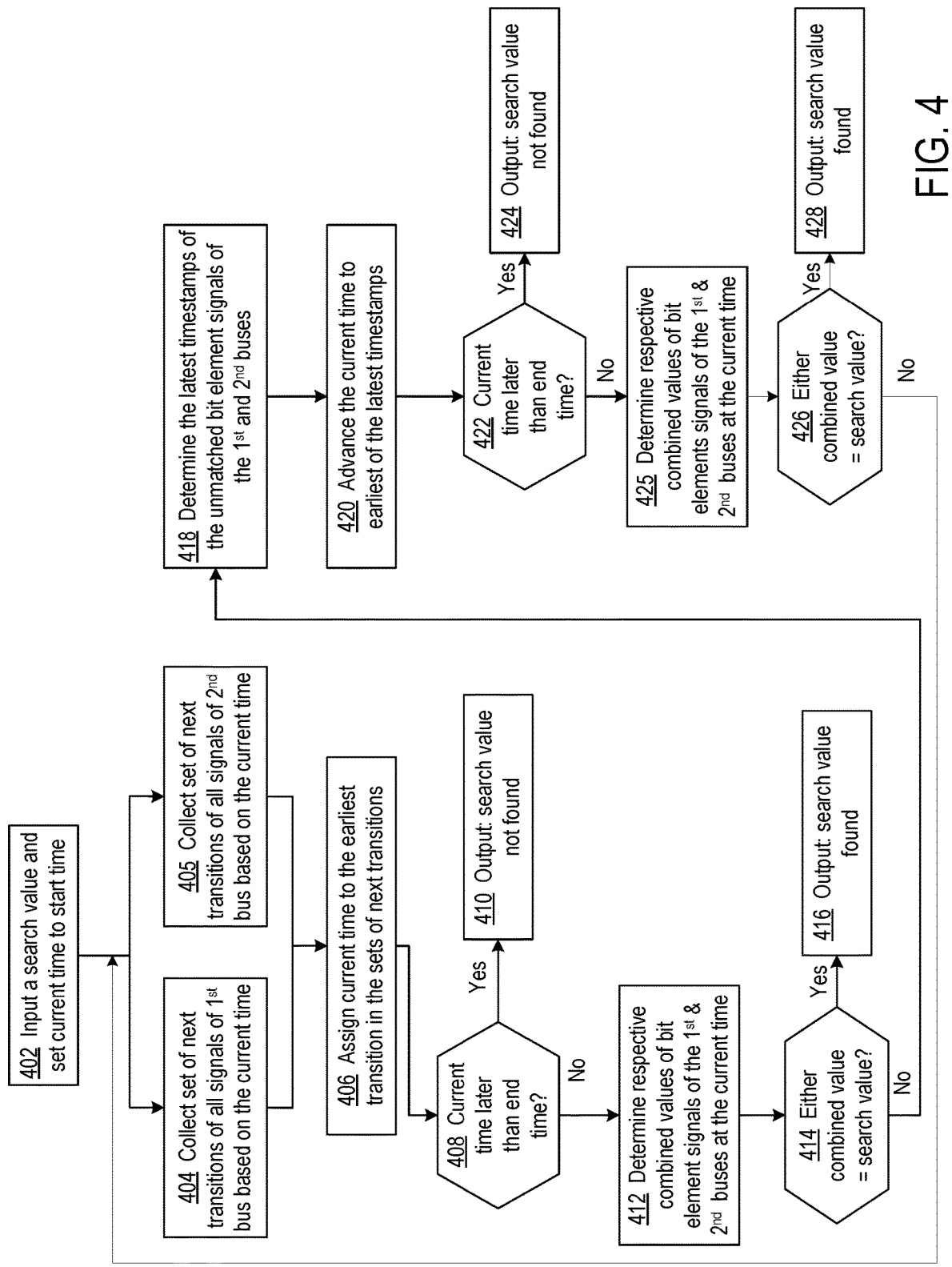
FIG. 4 illustrates a flowchart of an exemplary process for searching in a data set of time-ordered value pairs of digital waveforms of multiple buses for a search value.

FIG. 4 illustrates a flowchart of an exemplary process for locating a search value in a data set of time-ordered value pairs of digital waveforms of multiple buses. At block 402, a search value is input to a processor circuit, and a current time is set to the start time. At block 404, the processor collects a set of next transitions of all the bit element signals of a first bus based on the current time. At block 405, the processor collects a set of next transitions of all the bit element signals of a second bus based on the current time. Bit values of the bit element signals of the first bus and the bit element signals of the second bus at the current time are determined by the processor from a data set that includes time-ordered value pairs of the bit values and associated timestamps of the bit element signals of the first and second buses. Determining the set of next transitions and determining the bit values at the current time can include traversing B-trees, which are indexed by ranges of simulation times, for the bit element signals of each of the buses as described above.

At block 406, the processor assigns the current time to the earliest transition in the set of next transitions of the first and second buses collected at blocks 404 and 405.

At decision block 408, the processor determines whether the current time is later than the end time of the simulation. If the current time is later than the end time, then at block 410, the processor outputs data indicating that the search value was not found. If the current time is not later than the end time, then at block 412, the processor determines a combined value of the bit element signals of each of the first and second buses at the current time.

At decision block 414, the processor determines whether the combined value of each of the first and second buses determined at block 412 is equal to the search value. The combined values of the first and second buses are determined based on the set of next transitions collected at blocks 404 and 405. If the combined value of the first bus or the combined value of the second bus at the current time matches the search value, then at block 416, the processor outputs data indicative of the current time and the bit values of the bit element signals of the first bus and/or the second bus at the current time. In an exemplary implementation, the output data can be to a display device for rendering a waveform view such as that shown in FIG. 1, with the cursor displayed over the waveforms at the time at which the value of the first and/or second bus is equal to the search value. If neither the combined value of the first bus nor the combined value of the second bus at the current time matches the search value, then at block 418, the processor determines the latest timestamp of the unmatched bit element signals of the first bus and the latest timestamp of the unmatched bit element signals of the second bus.

At block 420, the processor advances the current time to the earliest of the latest timestamps determined at block 418. For example, if the latest timestamp of the unmatched bit element signals of the first bus is 1,700 ns and the latest timestamp of the unmatched bit element signals of the second bus is 1,750 ns, then the current time is advanced to 1,700 ns.

At decision block 422, the processor determines whether the current time is later than the end time of the simulation. If the end time is later than the current time, then at block 424, the processor outputs data indicating that the search value was not found. If the end time is not later than the current time, then the process proceeds to decision block 425. At block 425, the processor determines a combined value of the bit element signals of each of the first and second buses at the current time. At decision block 426, the processor determines whether the value of the first bus or the second bus determined at block 425 is equal to the search value. If either the value of the first bus or the value of the second bus at the current time matches the search value, then at block 428, the processor outputs data indicative of the current time and the bit values of the bit element signals of the first bus and/or the second bus at the current time. If neither the value of the first bus nor the value of the second bus at the current time matches the search value, then the process returns to blocks 404 and 405 where the processor collects a set of next transitions of all the bit element signals of the first and second buses, respectively, based on the current time.

The process continues as described above until the bit values of all of the plurality of bit element signals of the first bus and the second bus at the current time match values of the corresponding bits of the search value or reaching the end of the data set.

Implementations of the disclosed approaches are not limited to searching only two buses. Searching N buses includes the following modifications to FIG. 4. At blocks 404 and 405, the processor collects a set of next transitions of all the bit element signals for each of the N buses based on the current time. At blocks 412 and 425, the processor determines a combined value of the bit element signals of each of the N buses at the current time. At block 418, the processor determines the latest timestamp of the unmatched bit element signals of each of the N buses. At decision blocks 414 and 426, the processor determines whether the combined value of any of the N buses determined is equal to the search value.

Figure 5:
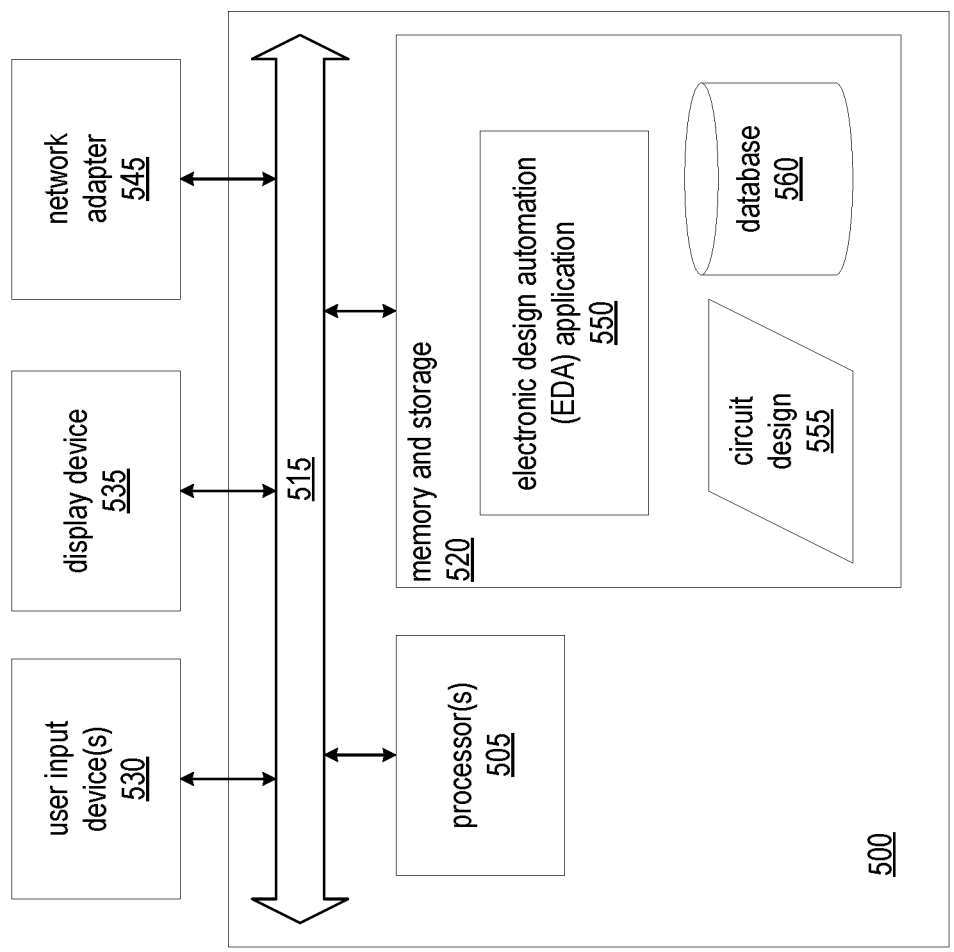
FIG. 5 is a block diagram illustrating an exemplary data processing system.

FIG. 5 is a block diagram illustrating an exemplary data processing system (system) 500. System 500 is an example of an electronic design automation (EDA) system. As pictured, system 500 includes at least one processor circuit (or "processor"), e.g., a central processing unit (CPU) 505 coupled to memory and storage arrangement 520 through a system bus 515 or other suitable circuitry. System 500 stores program code, circuit design 555, and database 560 within memory and storage arrangement 520. The database 560 stores a data set that includes time-ordered value pairs of bit values of bit element signals and associated timestamps of one or more buses of the circuit design 555. The data set can be generated during a simulation of the circuit design 555. Processor 505 executes the program code accessed from the memory and storage arrangement 520 via system bus 515. In one aspect, system 500 is implemented as a computer or other data processing system that is suitable for storing and/or executing program code. It should be appreciated, however, that system 500 can be implemented in the form of any system including a processor and memory that is capable of performing the functions described within this disclosure.

Memory and storage arrangement 520 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 500 may also include one or more cache memories (not shown) that provide temporary storage of at least some program code and data in order to reduce the number of times program code and data must be retrieved from local memory and persistent storage during execution.

Input/output (I/O) devices such as user input device(s) 530 and a display device 535 may be optionally coupled to system 500. Waveforms of bit element signals of one or more buses of the circuit design 555 generated during a simulation of the circuit design 555 can be displayed on the display device 535. The I/O devices may be coupled to system 500 either directly or through intervening I/O controllers. A network adapter 545 also can be coupled to system 500 in order to couple system 500 to other systems, computer systems, remote printers, and/or remote storage devices through intervening private or public networks. Modems, cable modems, Ethernet cards, and wireless transceivers are examples of different types of network adapter 545 that can be used with system 500.

Memory and storage arrangement 520 may store an EDA application 550. EDA application 550, being implemented in the form of executable program code, is executed by processor(s) 505. As such, EDA application 550 is considered part of system 500. System 500, while executing EDA application 550, receives and operates on circuit design 555. The EDA application 550 can perform a simulation of the circuit design 555. A data set generated by the simulation can be stored in the database 560. The EDA application 550 can include a waveform viewer, such as that shown in FIG. 1. The EDA application 550 can search the dataset stored in the database 560 for a search value of one or more buses of the circuit design 555 in accordance with the disclosed approaches. In one aspect, system 500 performs a design flow on circuit design 555, and the design flow may include synthesis, mapping, placement, routing, simulation, and bitstream generation.

EDA application 550, circuit design 555, and any data items used, generated, and/or operated upon by EDA application 550 are functional data structures that impart functionality when employed as part of system 500 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The disclosed methods and system are thought to be applicable to a variety of systems for preparing and/or maintaining circuit designs. Other aspects and features will be apparent to those skilled in the art from consideration of the specification. It is intended that the specification and drawings be considered as examples only, with a true scope of the invention being indicated by the following claims.

What is claimed is:

1. A method, comprising:
   inputting to a computer processor a start time and a search value;
   determining next transitions of a plurality of bit element signals of a bus from the start time from a data set that includes a plurality of time-ordered value pairs of timestamps indicating transition times and associated bit values and organized in a memory as a plurality of time-indexed B-trees corresponding to the plurality of bit element signals, by traversing the B-trees from the start time;
   initially setting a current time to a time indicated by a timestamp of an earliest of the next transitions;
   determining, by the computer processor, bit values of a plurality of the bit element signals at the current time from the next transitions;
   determining, by the computer processor, from the time-ordered value pairs whether the bit values of the plurality of bit element signals at the current time match values of corresponding bits of the search value;
   outputting, by the computer processor, data indicative of the current time and bit values of the plurality of bit element signals in response to the bit values of all of the plurality of bit element signals at the current time matching values of the corresponding bits of the search value;
   advancing, by the computer processor in response to any of the bit values of the plurality of bit element signals at the current time not matching values of the corresponding bits of the search value, the current time to a later time indicated by a latest timestamp of an unmatched bit value;
   determining current next transitions of the bit element signals by traversing each of the B-trees by advancing pointers in the B-trees to time indices later than the later time and skipping time indices having timestamps between the current time and the later time; and
   repeating the determining bit values using the current next transitions as the next transitions, determining whether the bit values match, advancing the current time, determining current next transitions, and advancing the pointers, until the bit values of all of the plurality of bit element signals at the current time match values of the corresponding bits of the search value or reaching an end of the data set.

2. The method of claim 1, wherein the outputting includes:
   displaying waveforms representing bit values of the plurality of bit element signals of the bus; and
   displaying a graphical indicator overlaid on the displayed waveforms at the current time.

3. The method of claim 1, wherein:
   the search value is associated with a subset of the plurality of bit element signals of the bus,
   the determining the match includes determining from the time-ordered value pairs whether the bit values of the subset of the plurality of bit element signals at the current time match the values of the corresponding bits of the search value;
   the outputting includes outputting data indicative of the current time and bit values of the subset of the plurality of bit element signals in response to the bit values of the subset of the plurality of bit element signals at the current time matching values of the corresponding bits of the search value;
   the advancing includes advancing, in response to any of the bit values of the subset of the plurality of bit element signals at the current time not matching values of the corresponding bits of the search value, the current time to the later time indicated by the latest timestamp of an unmatched bit value of the subset of the plurality of bit element signals;
   the determining current next transitions includes determining current next transitions of the subset of the plurality of bit element signals by traversing each of the B-trees by advancing pointers in the B-trees to time indices later than the later time and skipping time indices having timestamps between the current time and the later time; and
   the repeating includes repeating the determining the match using the current next transitions as the next transitions, the advancing, and the determining current next transitions until the bit values of all of the subset of the plurality of bit element signals at the current time match values of the corresponding bits of the search value or reaching the end of the data set.

4. The method of claim 3, wherein the search value includes one of the plurality of bit element signals associated with a most significant bit of the bit value of the plurality of bit element signals and excludes one of the bit element signals associated with a least significant bit of the bit value of the plurality of bit element signals.

5. The method of claim 3, wherein the search value includes one of the plurality of bit element signals associated with a least significant bit of the bit value of the plurality of bit element signals and excludes one of the bit element signals associated with a most significant bit of the bit value of the plurality of bit element signals.

6. The method of claim 1, wherein:
the determining the bit values includes collecting a set of next transitions of the plurality of bit element signals at the current time, the set of next transitions including a subset of the plurality of time-ordered value pairs; and
the method further comprises, subsequent the determining the bit values, advancing, by the computer processor, the current time to another time indicated by a timestamp of the set of next transitions having an earliest timestamp.

7. A system, comprising:
a computer system including:
a processor; and
a memory configured with instructions that when executed by the processor cause the processor to perform operations including:
inputting to the processor a start time and a search value;
determining next transitions of a plurality of bit element signals of a bus from the start time from a data set that includes a plurality of time-ordered value pairs of timestamps indicating transition times and associated bit values and organized in a memory as a plurality of time-indexed B-trees corresponding to the plurality of bit element signals, by traversing the B-trees from the start time;
initially setting a current time to a time indicated by a timestamp of an earliest of the next transitions;
determining bit values of the plurality of bit element signals at the current time from the next transitions;
determining from the time-ordered value pairs whether the bit values of the plurality of bit element signals at the current time match values of corresponding bits of the search value input to the processor;
outputting data indicative of the current time and bit values of the plurality of bit element signals in response to the bit values of all of the plurality of bit element signals at the current time matching values of the corresponding bits of the search value;
in response to any of the bit values of the plurality of bit element signals at the current time not matching values of the corresponding bits of the search value,
advancing the current time to a later time indicated by a latest timestamp of an unmatched bit value, and
determining current next transitions of the bit element signals by traversing each of the B-trees by advancing pointers in the B-trees to time indices later than the later time and skipping time indices having timestamps between the current time and a later time indicated by a latest timestamp of an unmatched bit value; and
repeating the determining bit values using the current next transitions as the next transitions, determining whether the bit values match, determining current next transitions, advancing the current time, and advancing the pointers until the bit values of all of the plurality of bit element signals at the current time match values of the corresponding bits of the search value or reaching an end of the data set.

8. The system of claim 7, wherein the memory is configured with instructions that when executed by the processor cause the processor to perform operations including:
displaying waveforms representing bit values of the plurality of bit element signals of the bus; and
displaying a graphical indicator overlaid on the displayed waveforms at the current time.

9. The system of claim 7, wherein:
the search value is associated with a subset of the plurality of bit element signals of the bus; and
the memory is configured with instructions that when executed by the processor cause the processor to perform operations including:
determining from the first time-ordered value pairs whether the bit values of the subset of the plurality of bit element signals at the current time match the values of the corresponding bits of the search value, wherein the search value is associated with a subset of the plurality of bit element signals of the bus;
outputting data indicative of the current time and bit values of the subset of the plurality of bit element signals in response to the bit values of the subset of the plurality of bit element signals at the current time matching values of the corresponding bits of the search value;
in response to any of the bit values of the subset of the plurality of bit element signals at the current time not matching values of the corresponding bits of the search value,
advancing the current time to the later time indicated by the latest timestamp of an unmatched bit value of the subset of the plurality of bit element signals, and
determining current next transitions of the subset of the plurality of bit element signals by traversing each of the B-trees by advancing pointers in the B-trees to time indices later than the later time and skipping time indices having timestamps between the current time and the later time; and
repeating the determining the match using the current next transitions as the next transitions, the advancing, and the determining current next transitions until the bit values of all of the subset of the plurality of bit element signals at the current time match values of the corresponding bits of the search value or reaching the end of the data set.

10. The system of claim 9, wherein the search value includes one of the plurality of bit element signals associated with a most significant bit of the bit value of the plurality of bit element signals and excludes one of the bit element signals associated with a least significant bit of the bit value of the plurality of bit element signals.

11. The system of claim 9, wherein the search value includes one of the plurality of bit element signals associated with a least significant bit of the bit value of the plurality of bit element signals and excludes one of the bit element signals associated with a most significant bit of the bit value of the plurality of bit element signals.

12. The system of claim 7, wherein the memory is configured with instructions that when executed by the processor cause the processor to perform operations including traversing time-indexed B-trees corresponding to the plurality of bit element signals of the bus to collect a set of next transitions of the plurality of bit element signals based on the current time.

13. The system of claim 12, wherein:
the memory is configured with instructions that when executed by the processor cause the processor to perform operations including advancing a pointer of each of the B-trees to the later time without reading entries of at least one of the B-trees between the current time and the later time; and
the entries correspond to a subset of the plurality of time-ordered value pairs having a timestamp between the current time and the latest timestamp.

14. The system of claim 7, wherein the memory is configured with instructions that when executed by the processor cause the processor to perform operations including:
collecting a set of next transitions of the plurality of bit element signals at the current time, the set of next transitions including a subset of the plurality of time-ordered value pairs; and
subsequent the determining the bit values, advancing, by the computer processor, the current time to another time indicated by a timestamp of the set of next transitions having an earliest timestamp.

15. A method, comprising:
performing by a computer processor, operations including:
storing simulation data in a memory as a plurality of B-trees, each B-tree indexed by time and having a plurality of time-ordered value pairs of timestamps indicating transition times and associated bit values of bit element signals of a bus;
inputting a start time and a search value;
determining next transitions of the bit element signals from the start time and timestamps in the plurality of B-trees by traversing the B-trees from the start time;
initially setting a current time to a time indicated by a timestamp of an earliest of the next transitions;
determining bit values of the bit element signals at the current time from the next transitions;
determining a search-complete condition or a search-incomplete condition based on whether or not the bit values of the plurality of bit element signals at the current time match the search value;
outputting data indicative of the current time and the bit values of the plurality of bit element signals at the current time in response to the search-complete condition;
in response to the search-incomplete condition:
advancing the current time to a later time indicated by a latest timestamp of an unmatched bit value;
determining current next transitions of the bit element signals by advancing pointers in the B-trees to time indices later than the later time, skipping time indices having timestamps between the current time and the later time; and
repeating the determining bit values using the current next transitions as the next transitions, determining a search-complete or search-incomplete condition, outputting, advancing the current time, and determining current next transitions until the search value matches the bit values or the current time is at an end of the simulation data.

16. The method of claim 15, wherein the search value specifies bit values of a subset of the bit element signals of the bus.

17. The method of claim 16, wherein the subset of the bit element signals includes a most significant bit of the bit element signals of the bus.

18. The method of claim 16, wherein the subset of the bit element signals includes a least significant bit of the bit element signals of the bus.

* * * * *